(12) United States Patent
Li et al.

(10) Patent No.: US 10,789,343 B2
(45) Date of Patent: Sep. 29, 2020

(54) IDENTITY AUTHENTICATION METHOD AND APPARATUS

(71) Applicant: Alibaba Group Holding Limited, George Town (KY)

(72) Inventors: Peng Li, Hangzhou (CN); Yipeng Sun, Hangzhou (CN); Yongxiang Xie, Hangzhou (CN); Liang Li, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/192,401

(22) Filed: Nov. 15, 2018

(65) Prior Publication Data
US 2019/0102531 A1    Apr. 4, 2019

Related U.S. Application Data

(63) Continuation of application No. PCT/CN2017/080196, filed on Apr. 12, 2017.

(30) Foreign Application Priority Data

May 19, 2016  (CN) .......................... 2016 1 0340549

(51) Int. Cl.
*H04L 9/32* (2006.01)
*G06F 21/32* (2013.01)
(Continued)

(52) U.S. Cl.
CPC ............... *G06F 21/32* (2013.01); *G06K 9/00* (2013.01); *G06K 9/00288* (2013.01);
(Continued)

(58) Field of Classification Search
USPC ................ 726/2, 21, 36; 713/150, 163, 181; 380/255, 264, 276
See application file for complete search history.

(56) References Cited

U.S. PATENT DOCUMENTS 9,686,238 B1 *  6/2017  Row, II ............... H04L 63/0876
2006/0206724 A1  9/2006  Schaufele
(Continued)

FOREIGN PATENT DOCUMENTS

CN      103841108      6/2014
CN      104361276      2/2015
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Sharif E Ullah
(74) *Attorney, Agent, or Firm* — Fish & Richardson P.C.

(57) ABSTRACT

An audio/video stream generated by a target object to be authenticated is obtained. The target object is associated with a user. A determination is made whether a lip reading component and voice component in the audio/video stream are consistent. In response to determining that the lip reading component and voice component are consistent, voice recognition is performed on an audio stream in the audio/video stream to obtain voice content. The voice content is used as an object identifier of the target object. A model physiological feature corresponding to the object identifier is obtained from object registration information. Physiological recognition is performed on the audio/video stream to obtain a physiological feature of the target object. The physiological feature of the target object is compared with the model physiological feature to obtain a comparison result. If the comparison result satisfies an authentication condition, the target object is authenticated.

20 Claims, 8 Drawing Sheets

(51) Int. Cl.
*H04L 29/06* (2006.01)
*G06K 9/00* (2006.01)
*G10L 17/00* (2013.01)
*G10L 17/06* (2013.01)

(52) U.S. Cl.
CPC ............ *G10L 17/005* (2013.01); *G10L 17/06* (2013.01); *H04L 29/06* (2013.01)

(56) References Cited

U.S. PATENT DOCUMENTS

| | | | | |
|---|---|---|---|---|
| 2011/0071830 | A1* | 3/2011 | Kim .................... | G01C 21/3602 704/246 |
| 2013/0267204 | A1* | 10/2013 | Schultz ................. | H04W 12/06 455/411 |
| 2015/0199502 | A1* | 7/2015 | Chen ........................ | G06F 21/32 705/325 |
| 2016/0249186 | A1* | 8/2016 | Dumov .................... | H04W 4/12 |
| 2019/0102531 | A1* | 4/2019 | Li ........................ | G10L 17/005 |
| 2019/0164156 | A1* | 5/2019 | Lindemann ........... | H04L 9/0877 |

FOREIGN PATENT DOCUMENTS

| | | |
|---|---|---|
| CN | 104598796 | 5/2015 |
| CN | 104834900 | 8/2015 |
| CN | 105141619 | 12/2015 |
| CN | 105426723 | 3/2016 |
| JP | 2007156974 | 6/2007 |
| JP | 2014085913 | 5/2014 |
| RU | 2543958 | 3/2015 |
| TW | I326427 | 6/2010 |
| WO | WO 2014139117 | 9/2014 |
| WO | WO 2016139655 | 9/2016 |

OTHER PUBLICATIONS

Nakamoto, "Bitcoin: A Peer-to-Peer Electronic Cash System," www.bitcoin.org, 2005, 9 pages.

PCT International Preliminary Report on Patentability in International Application No. PCT/CN2017/080196, dated Nov. 20, 2018, 8 pages ( with English translation).

PCT International Search Report and Written Opinion in International Application No. PCT/CN2017/080196, dated Jun. 30, 2017, 12 pages (with English translation).

International Search Report by the International Searching Authority issued in International Application No. PCT/CN2017/080196 dated Jun. 30, 2017; 8 pages.

European Extended Search Report in European Application No. 17798578.5, dated Apr. 5, 2019, 8 pages.

\* cited by examiner

IDENTITY AUTHENTICATION METHOD AND APPARATUS

CROSS-REFERENCE TO RELATED APPLICATIONS

This application is a continuation of PCT Application No. PCT/CN2017/080196, filed on Apr. 12, 2017, which claims priority to Chinese Patent Application No. 201610340549.4, filed on May 19, 2016, and each application is hereby incorporated by reference in its entirety.

TECHNICAL FIELD

The present application relates to network technologies, and in particular, to an identity authentication method and apparatus.

BACKGROUND

With the development of the Internet technologies, network-based services are more widely used by people. For example, people can send and receive emails by using a mailbox, shop online, or even work online. Some applications have high security requirements, and a user's identity needs to be authenticated. For example, a user's identity needs to be authenticated before payment is authorized for online shopping; or the user can log in to an application with a relatively high security requirement after the user's identity has been authenticated. In related technologies, there are several identity authentication methods used by the Internet, such as facial recognition and voiceprint recognition. However, these commonly used authentication methods are relatively complicated. For example, a user needs to enter the user's ID and then verify a voiceprint for voiceprint recognition. In addition, existing authentication methods are of relatively low reliability. For example, an attacker can achieve facial recognition by using an analog video or recording. Even if verification is performed based on two combined authentication methods, for example, with reference to a face and a voiceprint, as these authentication methods are relatively independent from each other, an attacker can break through the authentication processes. The previously described disadvantages of the identity authentication methods can create some risks to application security.

SUMMARY

In view of the above, the present application provides an identity authentication method and apparatus, so as to improve the efficiency and reliability of identity authentication.

Specifically, the present application is implemented by using the following technical solutions.

According to a first aspect, an identity authentication method is provided, and the method includes obtaining a collected audio and video stream, where the audio and video stream is generated by a target object to be authenticated; determining whether the lip reading and voice in the audio and video stream are consistent, and if the lip reading and the voice are consistent, using voice content obtained by performing voice recognition on an audio stream of the audio and video stream as an object identifier of the target object; obtaining a model physiological feature corresponding to the object identifier from object registration information, if the pre-stored object registration information includes the object identifier; performing physiological recognition on the audio and video stream to obtain a physiological feature of the target object; and comparing the physiological feature of the target object with the model physiological feature to obtain a comparison result, and if the comparison result satisfies an authentication condition, determining that the target object has been authenticated.

According to a second aspect, an identity authentication apparatus is provided, and the apparatus includes an information acquisition module, configured to obtain a collected audio and video stream, where the audio and video stream is generated by a target object to be authenticated; an identifier determining module, configured to determine whether the lip reading and voice in the audio and video stream are consistent, and if the lip reading and the voice are consistent, use voice content obtained by performing voice recognition on an audio stream in the audio and video stream as an object identifier of the target object; an information management module, configured to obtain a model physiological feature corresponding to the object identifier from object registration information, if the pre-stored object registration information includes the object identifier; a feature recognition module, configured to perform physiological recognition on the audio and video stream to obtain a physiological feature of the target object; and an authentication processing module, configured to compare the physiological feature of the target object with the model physiological feature to obtain a comparison result, and if the comparison result satisfies an authentication condition, determine that the target object has been authenticated.

According to the identity authentication method and apparatus provided in the present application, a user identifier is obtained through recognition of an audio and video stream during authentication of a user, and a facial feature and a voiceprint feature can also be verified by using the same audio and video stream. It simplifies the user's operation, improves the authentication efficiency, maintains a one-to-one authentication model, and ensures recognition accuracy. In addition, in the method, consistency between lip reading and voice is determined to ensure that a target object is a living object instead of a fake video record of an attacker, thereby improving the authentication security and reliability.

DESCRIPTION OF EMBODIMENTS

Figure 1:
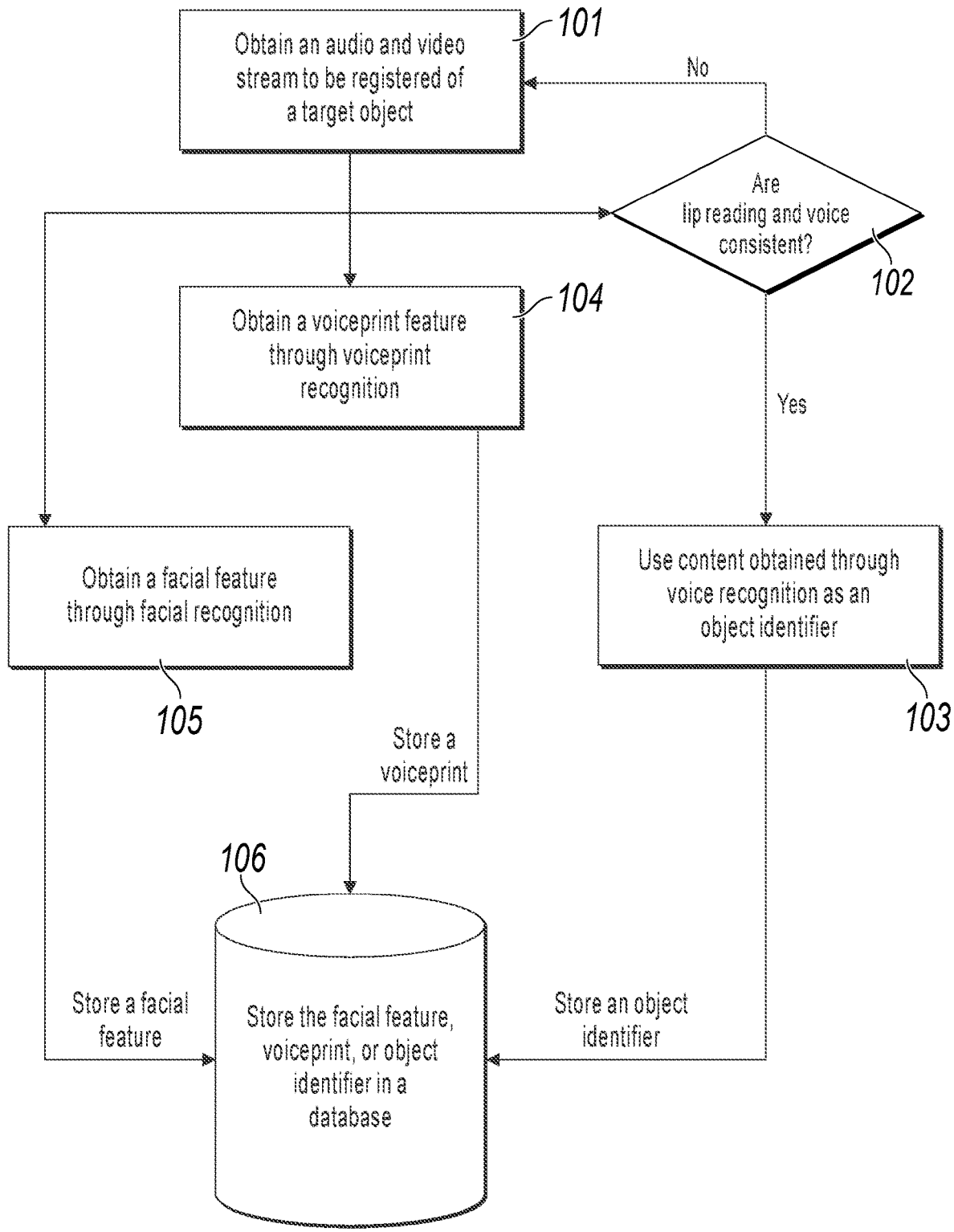
FIG. 1 illustrates an identity registration procedure, according to an example implementation of the present application.

Example implementations are described in detail here, and examples of the example implementations are presented in the accompanying drawings. When the following description relates to the accompanying drawings, unless specified otherwise, same numbers in different accompanying drawings represent same or similar elements. Implementations described in the following example implementations do not represent all implementations consistent with the present application. Instead, they are only examples of apparatuses and methods consistent with some aspects of the present application that are described in detail in the appended claims.

An identity authentication method provided in an implementation of the present application can be applied to Internet identity authentication. For example, a user can log in to a network application after having been authenticated by using the method, so as to ensure the security of application.

The following uses an application with a relatively high security requirement as an example. Assume that the application can run on a user's intelligent device, for example, a smartphone or an intelligent tablet. When the user needs to log in to the application on the intelligent device, an audio and video stream can be collected by using a camera and a microphone on the intelligent device. For example, the user can read an application ID of the user to a camera and a microphone of a mobile phone. The application ID can be an account number "123456" that is registered by the user in the application. After the user reads the application ID, the mobile phone can collect an audio and video stream of the user, including a video image and reading voice.

According to the identity authentication method in this implementation of the present application, the collected audio and video stream can be processed. Before authentication, the user needs to perform an identity registration procedure to perform the identity authentication later. The registration procedure is also performed based on the collected audio and video stream. The following separately describes an identity registration procedure and an identity authentication procedure. In addition, this implementation does not impose a limitation on a device that performs the identity registration or authentication processing in actual applications. For example, after the audio and video stream of the user is collected, the smartphone can transmit the audio and video stream to a backend server of the application, or a part of the processing can be performed on a client software side of the smartphone, and the other parts of the processing can be performed on a server side; or other methods can be used.

Identity Registration

In the method in this implementation, when the user performs identity registration, two types of information can be included. One type of information is an object identifier. For example, when a user logs in to an application, the user can be referred to as a target object. When the user registers with the application, information used to distinguish the user from another user is an object identifier in the application, for example, can be an account number 123456 of the user in an application, and the account number 123456 is an object identifier of the target object. The other type of information is physiological information that can uniquely identify a user, for example, a voiceprint feature of the user or a facial feature of the user. Usually, voiceprints and faces of different people are different, and physiological information that identifies each user can be referred to as a model physiological feature.

A mapping relationship is established between the two types of information: the object identifier and the model physiological feature, and the mapping relationship is stored. The correspondingly stored object identifier and model physiological feature of the target object can be referred to as "object registration information". For example, user Xiao Zhang can store object registration information of the user as "123456—model physiological feature A". For a more accurate identification of the user, the physiological information included in the model physiological feature used in this example can be at least two types of physiological information, for example, a face and a voiceprint.

FIG. 1 illustrates an example identity registration procedure. The procedure includes the following processing:

Step 101: Obtain an audio and video stream to be registered of a target object.

For example, a user registers with an application, and the user can read an account number "123456" of the application to an intelligent device of the user, such as a mobile phone. In this example, the user that is performing registration can be referred to as a target object; and a camera and a microphone of the intelligent device can collect an audio and video stream generated when the user reads the account number. The audio and video stream collected during registration can be referred to as an audio and video stream to be registered, including an audio stream and a video stream. The audio stream is reading voice of the user, and the video stream is a reading video image of the user.

After the audio and video stream in the present step is obtained, the three following aspects of processing can be performed to complete a user's registration. For details, references can be still made to FIG. 1.

In one aspect, processing is as follows: Step 102: Determine whether the lip reading and voice in the audio and video stream to be registered are consistent.

The consistency here indicates a mapping relationship between a lip movement and a movement indicated by voice. For example, assume that voice is "the weather today is sunny", where the voice is generated at a low speed, but a lip movement corresponds to "the weather today is sunny" generated at a high speed. It is obvious that the voice and the lip movement do not correspond to each other: when the lip movement has stopped (content is completely read), the voice continues ( . . . today is sunny). This may occur in many possible situations, such as when an attacker attempts to pass a users' ID and facial detection, the attacker can attack facial detection by using a previous video record of the user (the attacked user), and the attacker reads the user's ID to attack recognition of the voice content ID. As such, the attacker may be authenticated. However, in such an attack, lip reading and voice are usually inconsistent, and it can be determined that the reader is not the user.

As shown in step 102, if it is determined that the lip reading and the voice in the audio and video stream to be registered are inconsistent, a registration failure can be notified to the user. Alternatively, as shown in FIG. 1, go to step 101 to collect an audio and video stream again to prevent a processing error.

Otherwise, if it is determined that the lip reading and the voice in the audio and video stream to be registered are consistent, perform step 103: Use voice content obtained by performing voice recognition on the audio stream in the collected audio and video stream, as an object identifier of the target object. Voice recognition uses computer technologies to automatically recognize voice content of a person, that is, the recognition process of converting voice to content. For example, after voice recognition is performed on audio of reading "123456" by the user that is to perform registration, obtained voice content of the audio stream is "123456", and content obtained through recognition can be used as the user's identifier, namely, the user's ID.

The previous voice recognition of the audio stream can be performed after it is determined that the lip reading and the voice are consistent, to obtain the object identifier, or can be performed in a process of determining whether the lip reading and the voice are consistent, to obtain the object identifier.

In another aspect, physiological recognition is performed on the audio and video stream to be registered, to obtain a model physiological feature of the audio and video stream to be registered. In this example, a physiological feature includes a facial feature and a voiceprint feature, but is not limited to the two features, provided that an example feature can uniquely identify a user, and can be used to distinguish between physiological features of different users. In this aspect, as shown in step 104, voiceprint recognition can be performed on the audio stream in the audio and video stream to be registered, to obtain a voiceprint feature of the target object.

In yet another aspect, facial detection is performed on the video stream in the audio and video stream to be registered, to obtain a facial feature of the target object.

In the registration procedure, the detected facial feature can be referred to as a model facial feature and used as a criterion in a subsequent authentication process. Likewise, the detected voiceprint feature can also be referred to as a model voiceprint feature, and the model voiceprint feature and the model facial feature can be collectively referred to as a model physiological feature.

In this implementation, the model physiological feature and the object identifier of the target object are also referred to as object registration information. After it is determined that data in the object registration information is complete, in step 106, the object identifier of the target object and the corresponding model physiological feature are stored in a database as the object registration information.

In addition, an execution order of the three aspects shown in FIG. 1 is not limited. For example, after the audio and video stream to be registered is obtained in step 101, the three aspects can be executed in parallel. If the lip reading and the voice are inconsistent, a recognized voiceprint feature and a recognized facial feature may not be stored. Alternatively, after it is determined that the lip reading and the voice are consistent, detection and recognition are then performed on the voiceprint feature and the facial feature.

Figure 2:
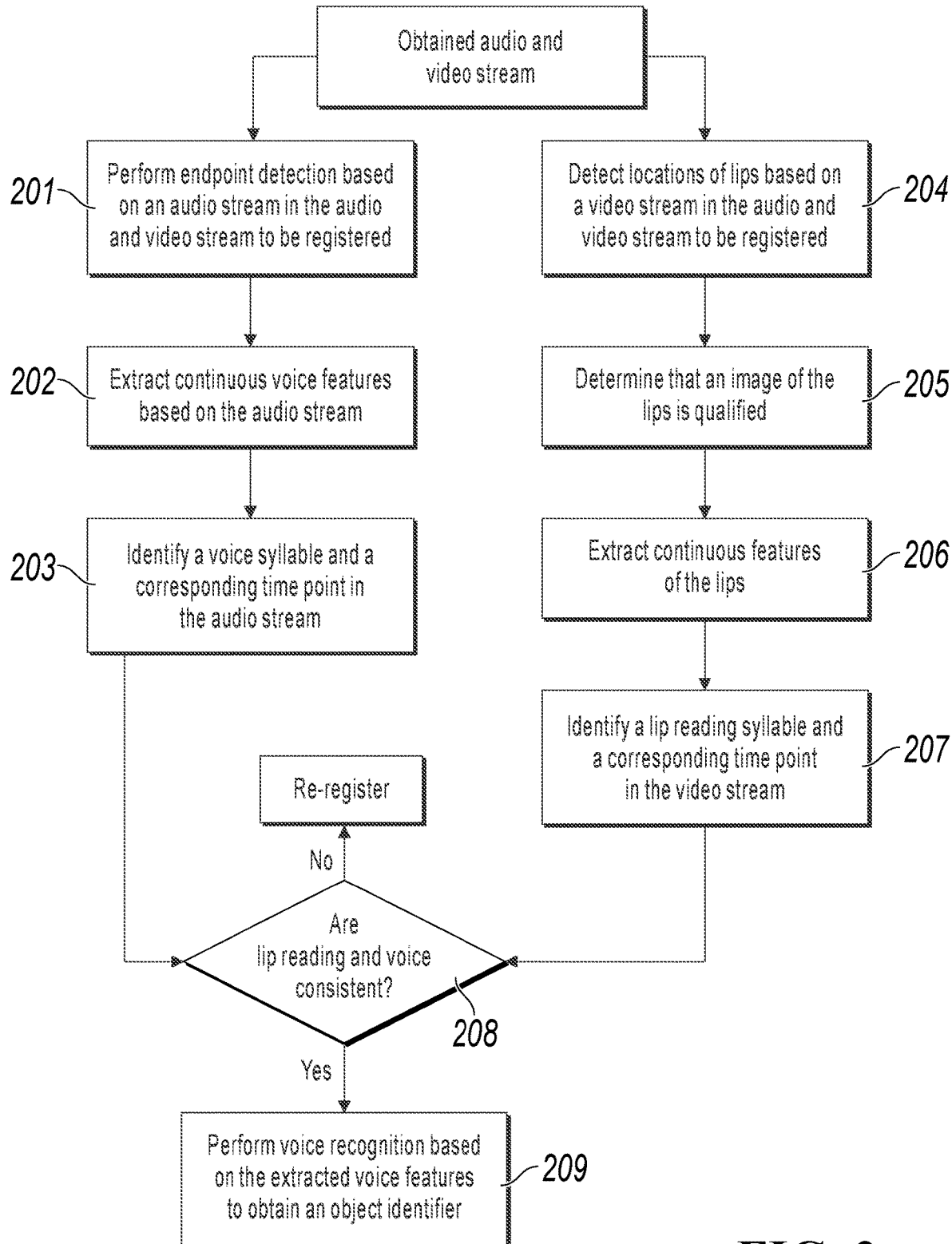
FIG. 2 illustrates a procedure of determining consistency between lip reading and voice, according to an example implementation of the present application.

FIG. 2 illustrates a procedure of determining consistency between lip reading and voice in FIG. 1. The procedure can include the following steps:

Step 201: Perform endpoint detection based on an audio stream in an audio and video stream to be registered. In the present step, a start time and an end time of an audio stream can be detected in the continuous audio stream.

Step 202: Extract continuous voice features based on the audio stream, where the features include but are not limited to an MFCC feature and an LPCC feature. The features extracted in the present step can be used for voice recognition.

Step 203: Identify a voice syllable and a corresponding time point in the audio stream. In the present step, each syllable in the audio stream can be identified based on the voice features extracted in step 202, and a corresponding appearing time point and a corresponding disappearing time point of the syllable can be determined. The voice recognition method includes but is not limited to methods such as a hidden Markov model (HMM), a deep neural network (DNN), and a Long Short Time Model (LSTM).

Step 204: Detect locations of lips based on a video stream in the audio and video stream to be registered. In the present step, the locations of the lips can be detected from a video image.

Step 205: Determine quality of a detected lip image. For example, parameters such as definition and exposure of the locations of the lips can be determined. If the definition is low or the degree of exposure is too high, it is determined that the image is not qualified; and in this case, collect an audio and video stream to be registered again. If the image is qualified, proceed to step 206 to perform lip reading recognition.

Step 206: Extract continuous features of the lips. In the present step, a feature can be extracted from continuous lip images, and the feature includes but is not limited to a local image descriptor such as a bare pixel, an LBP, Gabor, SIFT, or Surf.

Step 207: Identify a lip reading syllable and a corresponding time point in the video stream. In the present step, the lip reading syllable can be identified by using methods such as a hidden Markov model (HMM) and a Long Short Time Model. A time point corresponding to a lip reading syllable in a video time sequence is also determined by using the model during lip reading recognition.

Step 208: Determine whether both the lip reading syllable and the voice syllable are consistent with the corresponding time point. For example, in the present step, the time point information of the voice syllable can be compared with the time point information of the lip reading syllable. If a comparison result indicates consistency, it is considered that the audio stream is generated by a real person; in this case, proceed to step 209. If a comparison result indicates inconsistency, it is suspected that the audio stream is an attack behavior; and in this case, go back to the registration procedure. In this implementation, a method of detecting consistency between both the lip reading syllable and the voice syllable and the corresponding time point is more detailed, and therefore there is higher accuracy in determining a real person's voice.

Step 209: Perform voice recognition on the voice features extracted in step 202, to obtain a user's ID, namely, the object identifier. The voice recognition method includes but is not limited to methods such as a hidden Markov model (HMM), a deep neural network (DNN), and a Long Short Time Model (LSTM).

In addition, in the example shown in FIG. 2, voice recognition of the audio stream can be performed in step 209 after it is determined that the lip reading and the voice are consistent. Alternatively, when the syllable time point in the audio stream is identified in step 203, the user's ID is obtained by performing voice recognition based on the voice feature. In this case, after it is determined that the lip reading and the voice are consistent in step 208, the user's ID obtained through recognition can be directly used as the object identifier.

Figure 3:
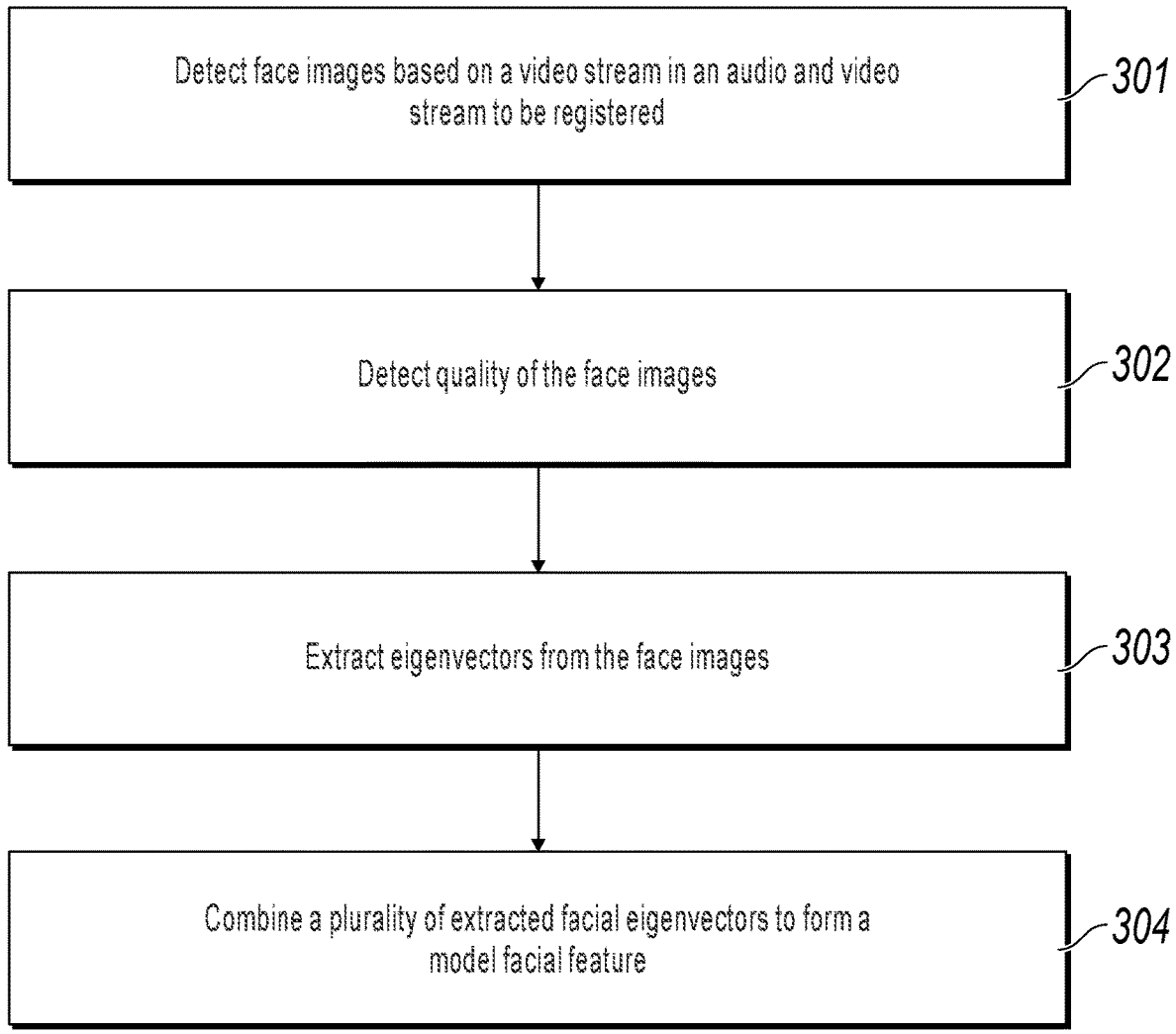
FIG. 3 illustrates a facial feature recognition procedure, according to an example implementation of the present application.

FIG. 3 illustrates a facial feature recognition procedure in FIG. 1. The procedure can include the following steps:

Step 301: Detect face images based on a video stream in an audio and video stream to be registered. In the present step, a video frame image can be extracted from the video stream in the audio and video stream, and it can be detected whether a face appears in the video frame image. If yes, proceed to step 302. Otherwise, go back to the determining procedure.

Step 302: Detect quality of the face images. In the present step, facial feature point detection can be performed on the face detected in step 301, and angles of the face in both a horizontal direction and a vertical direction can be determined based on a result of the feature point detection. If both the angles do not exceed certain tilt angles, a quality requirement is satisfied. Otherwise, a quality requirement is not satisfied. In addition, definition, exposure, etc. of a face area are determined, which also need to be within certain thresholds. If the face images are of good quality, a facial feature can be better recognized.

Step 303: For face images that satisfy the quality requirement, extract eigenvectors from the face images, where the eigenvectors include but are not limited to a local binary pattern (LBP), Gabor, a convolutional neural network (CNN), etc.

Step 304: Combine a plurality of facial eigenvectors extracted in step 303, to form a unique facial feature of a user, namely, a model facial feature.

Figure 4:
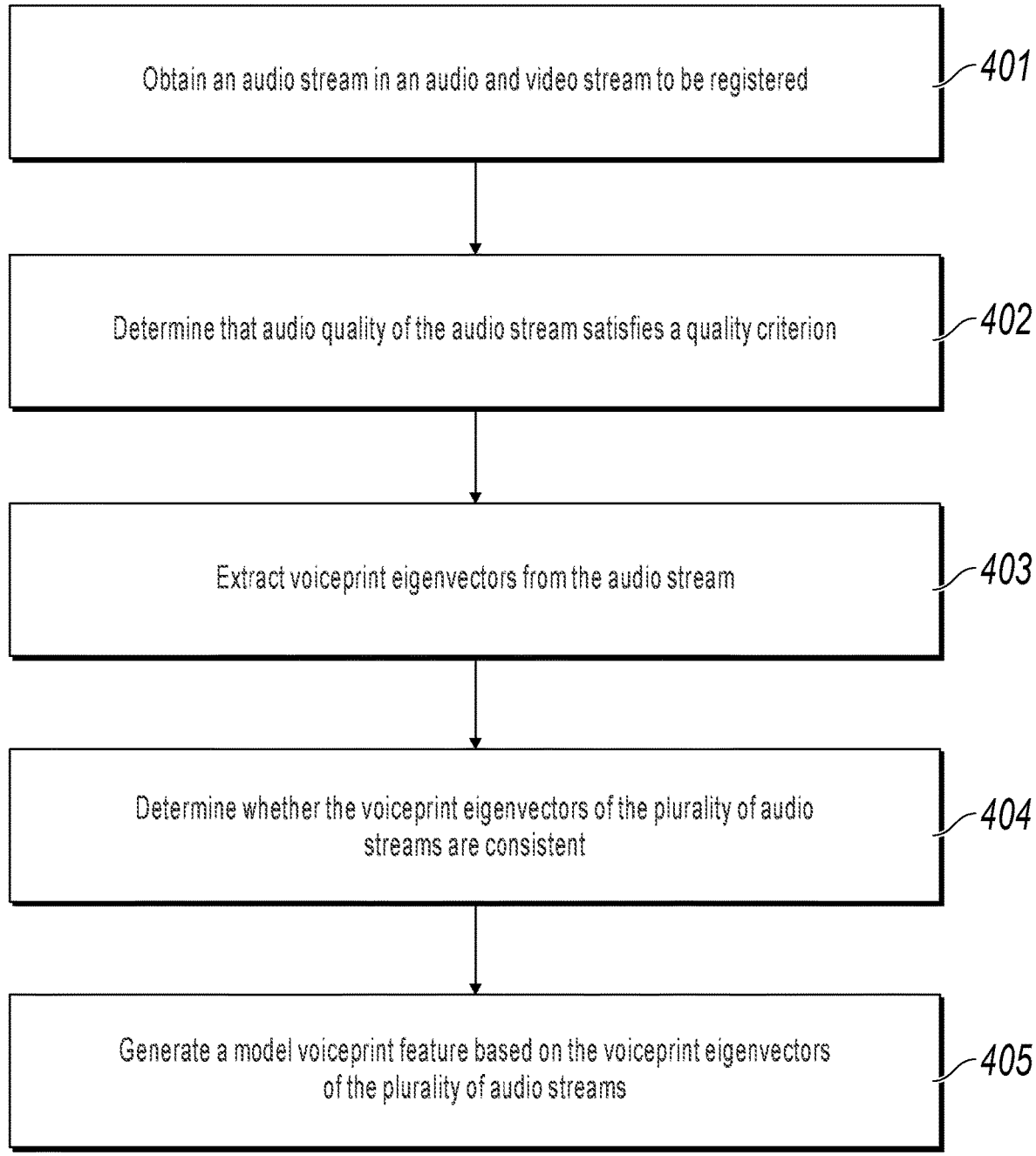
FIG. 4 illustrates a voiceprint feature recognition procedure, according to an example implementation of the present application.

FIG. 4 illustrates a voiceprint feature recognition procedure in FIG. 1. The procedure can include the following steps.

Step 401: Obtain an audio stream in an audio and video stream to be registered.

In this example, voiceprint feature recognition can be performed based on the audio stream in the audio and video stream to be registered.

Step 402: Determine that audio quality of the audio stream satisfies a quality criterion.

In the present step, audio quality can be determined. Better quality of the collected audio stream leads to a better effect of performing voiceprint recognition on the audio. Therefore, before subsequent voiceprint recognition is performed, the quality of the audio stream can be determined first. For example, information such as signal strength and a signal-to-noise ratio of voice in the audio stream can be calculated to determine whether the voice satisfies a quality criterion. For example, the quality criterion can be that a signal-to-noise ratio falls within a certain range, or can be that signal strength of voice is greater than a strength threshold. If the audio stream is qualified, proceed to step 403. Otherwise, collect an audio and video stream to be registered again.

Step 403: Extract voiceprint eigenvectors from the audio stream.

In this example, there can be a plurality of audio and video streams to be registered. For example, the user can read the user's ID twice, and correspondingly two audio and video streams are collected. In the present step, a voiceprint eigenvector of an audio stream in each audio and video stream can be extracted. The eigenvector can be extracted in a plurality of methods, and details are omitted here for simplicity. For example, a voice feature parameter mel-frequency cepstral coefficient (MFCC) can be extracted from a voice signal of an audio stream, and then an eigenvector is calculated by using a method such as an i-vector (a speaker recognition algorithm) or a probabilistic linear discriminant analysis (PLDA, that is, a channel compensation algorithm for voiceprint recognition).

Step 404: Determine whether the voiceprint eigenvectors of the plurality of audio streams are consistent.

For example, when the user reads the user's ID at least twice during registration, there are correspondingly at least two collected audio streams. To ensure that a difference between voiceprint features of the plurality of audio streams is not too big, voiceprint consistency determining can be performed between the plurality of audio streams. For example, a score of similarity between the plurality of audio streams can be calculated based on a voiceprint eigenvector extracted from each audio stream in step 403.

If the similarity score falls within a certain score threshold, it indicates that the audio streams satisfy a similarity requirement; and in this case, proceed to step 405. Otherwise, it indicates that there is a big difference between the plurality of audio entered by the user, and the user that is performing registration can be instructed to read the user's ID again, that is, to collect an audio stream again.

Step 405: Generate a model voiceprint feature based on the voiceprint eigenvectors of the plurality of audio streams.

In the present step, weighted summation can be performed on voiceprint eigenvectors extracted from audio streams in the previous step, to obtain the model voiceprint feature.

After the previous registration procedure is completed, the object registration information of the target object has been stored in the database. The object registration information can include an object identifier and a corresponding model physiological feature. The model physiological feature can include a model voiceprint feature and a model facial feature, and identity authentication processing of an object can be performed below based on the object registration information.

Identity Authentication

Figure 5:
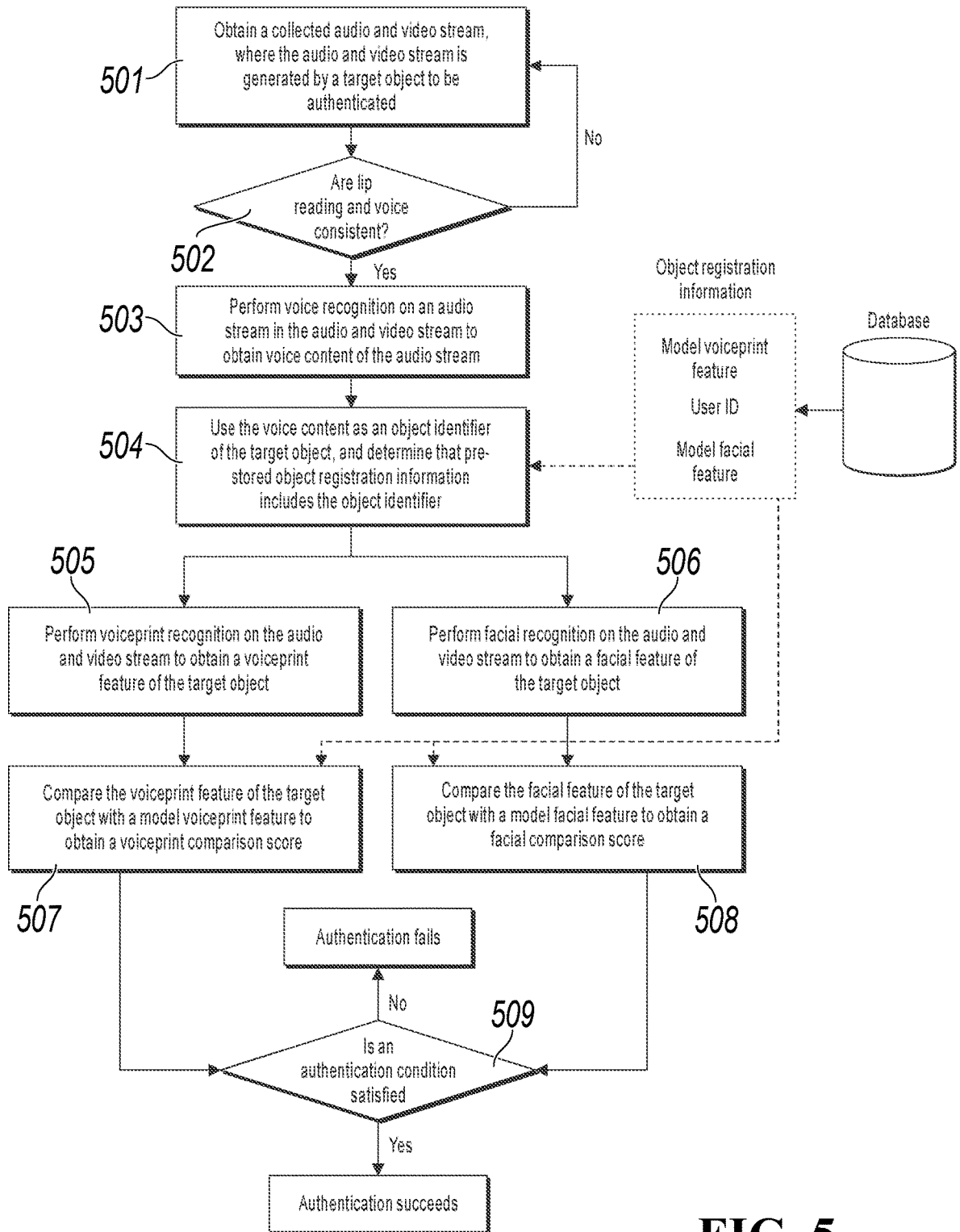
FIG. 5 illustrates an identity authentication procedure, according to an example implementation of the present application.

FIG. 5 illustrates an example identity authentication procedure. In this procedure, a physiological feature used for authentication is described by using a combination of a facial feature and a voiceprint feature as an example. In addition, physiological features can be compared after it is determined that a target object that is being authenticated is a living object instead of a video. As shown in FIG. 5, the authentication procedure includes the following processing:

Step 501: Obtain a collected audio and video stream, where the audio and video stream is generated by a target object to be authenticated.

For example, a user can log in to an application with a relatively high security requirement only after the user's identity has been authenticated by the application. In the present step, the user can start an application on an intelligent device, for example, a smartphone of the user, and the user can collect an audio and video stream to be authenticated by using a camera and a microphone of the smartphone. The audio and video stream can be generated when the user reads the user's application ID.

Step 502: Determine whether the lip reading and voice in the audio and video stream are consistent.

In this example, it can be first determined whether the lip reading and the voice in the audio and video stream are consistent. For a specific consistency determining procedure, references can be made to FIG. 2, and details are omitted here for simplicity.

If the lip reading and the voice are consistent, it indicates that the target object that is being authenticated is a living object instead of a video, etc. In this case, proceed to step 503. Otherwise, go back to step 501 to perform collection again.

Step 503: Perform voice recognition on an audio stream in the audio and video stream to obtain voice content of the audio stream. For example, the voice content obtained through recognition can be a user's ID "123456".

Step 504: Use the voice content as an object identifier of the target object, and determine whether pre-stored object registration information includes the object identifier.

For example, if the pre-stored object registration information includes the object identifier, a model physiological feature corresponding to the object identifier can be obtained in the object registration information, for example, a model facial feature and a model voiceprint feature. Physiological recognition is further performed on the audio and video stream to be authenticated, to obtain a physiological feature of the target object, so as to compare the physiological feature with the model physiological feature. If the pre-stored object registration information does not include the object identifier, the user can be notified that the user has not performed registration.

Step 505: Perform voiceprint recognition on the audio and video stream to obtain a voiceprint feature of the target object. For extraction of the voiceprint feature in the present step, references can be made to FIG. 4.

Step 506: Perform facial recognition on the audio and video stream to obtain a facial feature of the target object.

Then the physiological feature of the target object can be compared with the model physiological feature to obtain a comparison result, and if the comparison result satisfies the authentication condition, it is determined that the target object has been authenticated. For example, step 507 to step 509 are included.

Step 507: Compare the voiceprint feature of the target object with a model voiceprint feature to obtain a voiceprint comparison score.

Step 508: Compare the facial feature of the target object with a model facial feature to obtain a facial comparison score.

Step 509: Determine whether the voiceprint comparison score and the face alignment score satisfy the authentication condition.

For example, it is determined that the target object has been authenticated if the voiceprint comparison score and the facial comparison score satisfy at least one of the following: the voiceprint comparison score is greater than a voiceprint score threshold, and the facial comparison score is greater than a facial score threshold; or a product of the voiceprint comparison score and the facial comparison score is greater than a corresponding product threshold; or a weighted sum of the voiceprint comparison score and the facial comparison score is greater than a corresponding weighted threshold.

If it is determined that the voiceprint comparison score and the facial comparison score satisfy the authentication condition in the present step, it is determined that the target object has been authenticated. Otherwise, it is determined that the target object fails to be authenticated.

In addition, in this identity authentication example, similar to the previous identity registration procedure, voice recognition can be performed on an audio stream to obtain a user's ID after it is determined that lip reading and voice are consistent, or a user's ID can be obtained when a syllable time point in an audio stream is identified. In the previous example, the user's ID is identified after it is determined that lip reading and voice are consistent.

According to the identity authentication method in this implementation of the present application, an audio and video stream needs to be generated only once during authentication of a user. For example, the user needs to read the user's ID only once. In the method, the user's ID can be obtained by performing voice recognition on the audio and video stream, and a facial feature and a voiceprint feature can also be verified by using the same audio and video stream. It simplifies the user's operation, improves the authentication efficiency, maintains a one-to-one authentication model, and ensures recognition accuracy. In other words, the recognized physiological feature is compared only with a feature corresponding to an object identifier in a database, thereby ensuring recognition accuracy. In addition, in the method, consistency between lip reading and voice is determined to ensure that a target object is a living object instead of a fake video record of an attacker, thereby improving the authentication security and reliability. In the method, the user's ID and the physiological feature obtained through recognition are obtained based on the same audio and video stream. To some extent, a fake audio and video stream of an attacker can be recognized.

Figure 6:
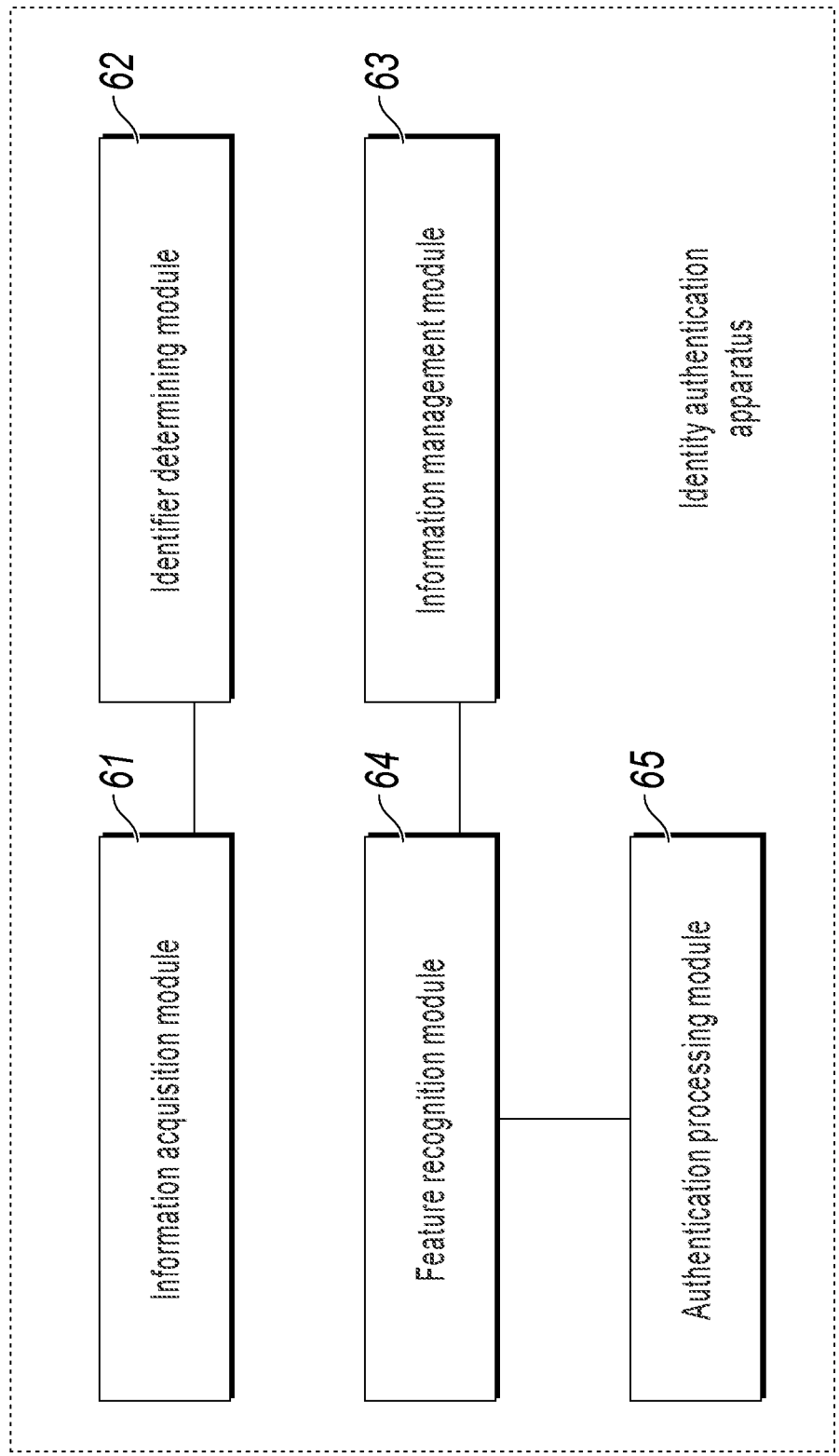
FIG. 6 is a structural diagram of an identity authentication apparatus, according to an example implementation of the present application.

To implement the previous identity authentication method, an implementation of the present application further provides an identity authentication apparatus. As shown in FIG. 6, the apparatus can include an information acquisition module 61, an identifier determining module 62, an information management module 63, a feature recognition module 64, and an authentication processing module 65.

The information acquisition module 61 is configured to obtain a collected audio and video stream, where the audio and video stream is generated by a target object to be authenticated.

The identifier determining module 62 is configured to determine whether the lip reading and voice in the audio and video stream are consistent, and if the lip reading and the voice are consistent, use voice content obtained by performing voice recognition on an audio stream in the audio and video stream as an object identifier of the target object.

The information management module 63 is configured to obtain a model physiological feature corresponding to the object identifier from object registration information, if the pre-stored object registration information includes the object identifier.

The feature recognition module 64 is configured to perform physiological recognition on the audio and video stream to obtain a physiological feature of the target object.

The authentication processing module 65 is configured to compare the physiological feature of the target object with the model physiological feature to obtain a comparison result, and if the comparison result satisfies an authentication condition, determine that the target object has been authenticated.

Figure 7:
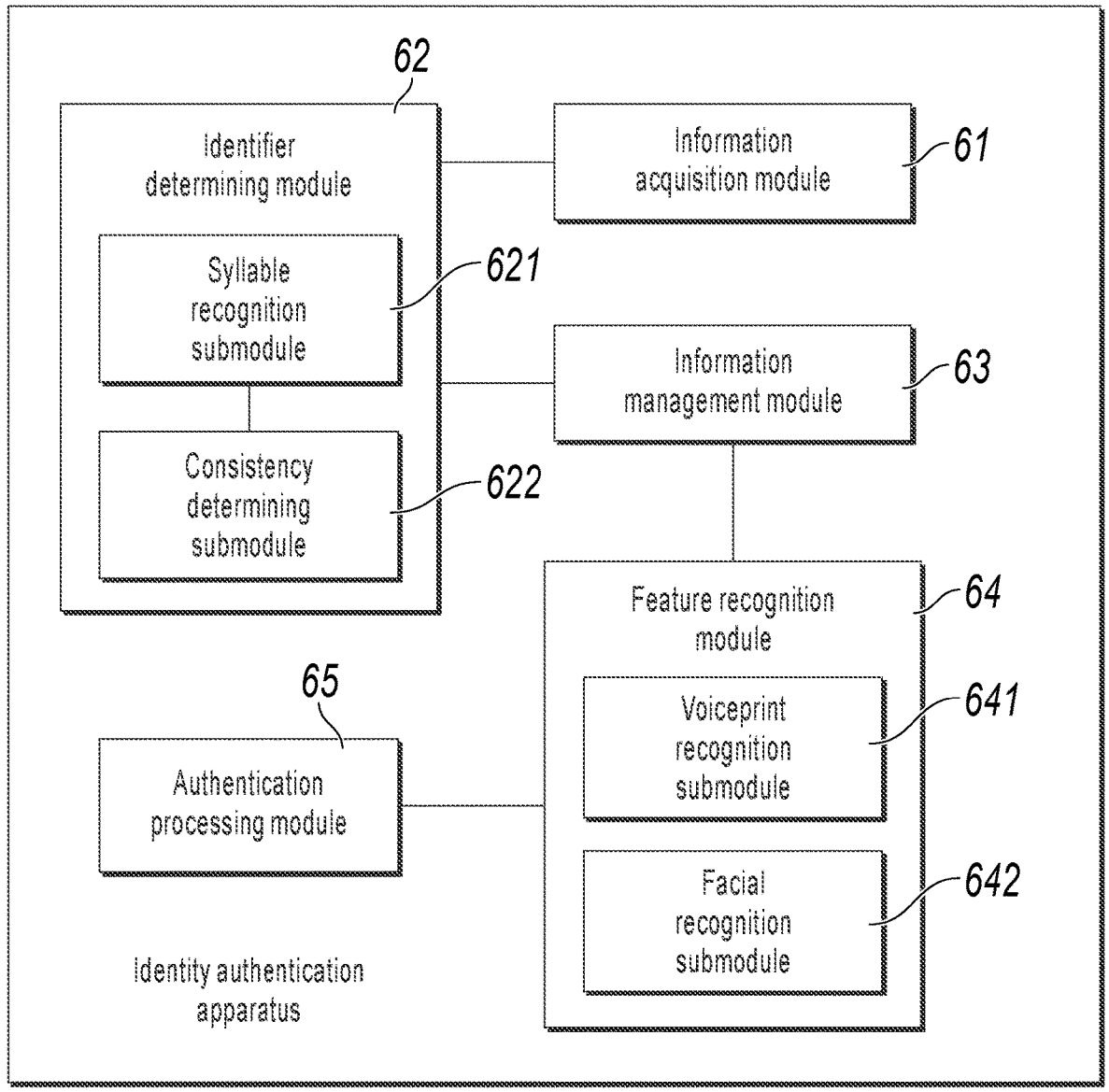
FIG. 7 is a structural diagram of an identity authentication apparatus, according to an example implementation of the present application.

Referring to FIG. 7, in an example, the feature recognition module 64 can include a voiceprint recognition submodule 641 and a facial recognition submodule 642.

The voiceprint recognition submodule 641 is configured to perform voiceprint recognition on the audio and video stream to obtain a voiceprint feature of the target object.

The facial recognition submodule 642 is configured to perform facial recognition on the audio and video stream to obtain a facial feature of the target object.

The authentication processing module 65 is configured to compare the voiceprint feature of the target object with the model voiceprint feature to obtain a voiceprint comparison score, and compare the facial feature of the target object with the model facial feature to obtain a facial comparison score;

and if the voiceprint comparison score and the facial comparison score satisfy the authentication condition, determine that the target object has been authenticated.

In an example, it is determined that the target object has been authenticated if the voiceprint comparison score and the facial comparison score satisfy at least one of the following: the voiceprint comparison score is greater than a voiceprint score threshold, and the facial comparison score is greater than a facial score threshold; or a product of the voiceprint comparison score and the facial comparison score is greater than a corresponding product threshold; or a weighted sum of the voiceprint comparison score and the facial comparison score is greater than a corresponding weighted threshold.

In an example, as shown in FIG. 7, the identifier determining module 62 can include the following: a syllable recognition submodule 621, configured to identify a voice syllable and a corresponding time point in the audio stream in the audio and video stream, and identify a lip reading syllable and a corresponding time point in a video stream in the audio and video stream; and a consistency determining submodule 622, configured to determine that the lip reading and the voice are consistent if both the voice syllable and the lip reading syllable are consistent with the corresponding time point.

In an example, the information acquisition module 61 is further configured to obtain an audio and video stream to be registered of the target object.

The identifier determining module 62 is further configured to use voice content obtained by performing voice recognition on an audio stream in the audio and video stream as the object identifier of the target object, when the lip reading and the voice in the audio and video stream to be registered are consistent.

The feature recognition module 64 is further configured to perform physiological recognition on the audio and video stream to be registered, to obtain the model physiological feature of the audio and video stream to be registered.

The information management module 63 is further configured to correspondingly store the object identifier of the target object and the corresponding model physiological feature in the object registration information.

The previous descriptions are merely example implementations of the present application, and are not intended to limit the present application. Any modifications, equivalent replacements, improvements, etc. made within the spirit and principle of the present application shall fall within the protection scope of the present application.

Figure 8:
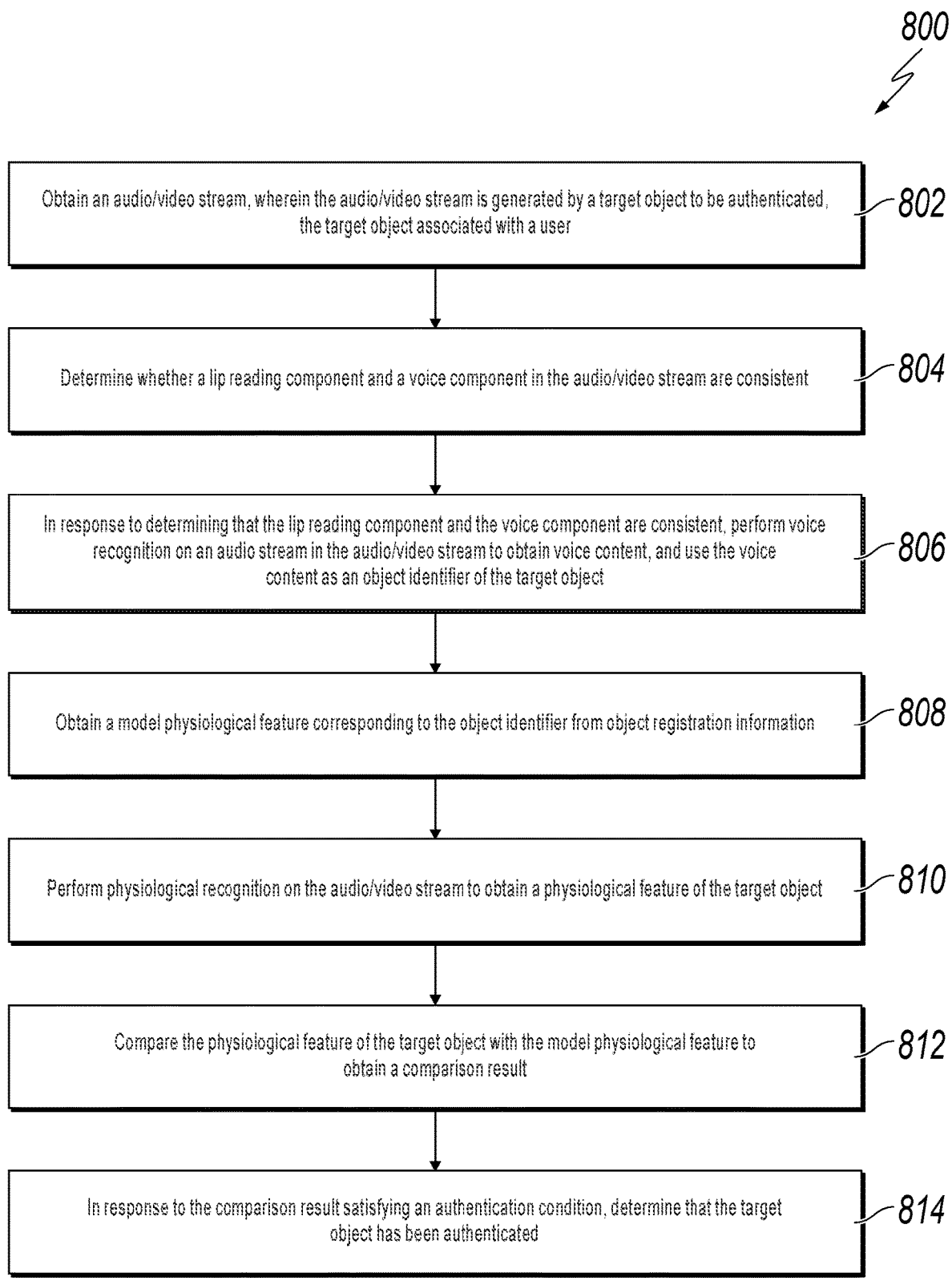
FIG. 8 is a flowchart illustrating an example of a computer-implemented method for using physiological recognition techniques on an audio/video stream to perform an identity authentication of a user, according to an implementation of the present disclosure.

FIG. 8 is a flowchart illustrating an example of a computer-implemented method 800 for using physiological recognition techniques on an audio/video stream to perform an identity authentication of a user, according to an implementation of the present disclosure. For clarity of presentation, the description that follows generally describes method 800 in the context of the other figures in this description. However, it will be understood that method 800 can be performed, for example, by any system, environment, software, and hardware, or a combination of systems, environments, software, and hardware, as appropriate. In some implementations, various steps of method 800 can be run in parallel, in combination, in loops, or in any order.

At 802, an audio/video stream is obtained. The audio/video stream is generated by a target object to be authenticated. The target object is associated with a user. For example, referring to FIGS. 2 and 5, receiving the audio/video stream can be a first step in procedures for determining consistency between lip reading and voice components of an audio/video stream. The information acquisition module 61 (FIG. 6), for example, can collect an audio/video stream provided by the user (target object). From 802, method 800 proceeds to 804.

At 804, a determination is made whether a lip reading component and a voice component in the audio/video stream are consistent. For example, the identity authentication apparatus described with reference to FIG. 6 can determine that a lip reading component (obtained from the video) is consistent with a voice component (obtained from the audio). Specifically, the identifier determining module 62 can determine whether the lip reading component and the voice component are consistent. If the lip reading component and the voice component are consistent, the identifier determining module 62 can use voice content obtained by performing voice recognition on the audio stream as an object identifier of the user. From 804, method 800 proceeds to 806.

At 806, in response to determining that the lip reading component and the voice component are consistent, voice recognition is performed on an audio stream in the audio/video stream to obtain voice content, and the voice content is used as an object identifier of the target object. As an example, the identifier determining module 62 can use voice content (obtained by performing voice recognition on the audio stream) as an object identifier of the user.

In some implementations, determining whether the lip reading component and the voice component are consistent can include matching syllables between the components. For example, a voice syllable and a voice syllable time point in the audio stream at which the voice syllable occurs can be identified. Also, a lip reading syllable and a lip reading time point in the video stream at which the lip reading syllable occurs can be identified. The lip reading component and the voice component can be determined to be consistent if, for example, at least the voice syllable time point and the lip reading time point are consistent. From 806, method 800 proceeds to 808.

At 808, a model physiological feature corresponding to the object identifier is obtained from object registration information. The information management module 63, for example, can obtain a model physiological feature corresponding to the object identifier from object registration information (previously stored for the user).

In some implementations, method 800 can further include receiving a user authentication request during a user login to a network application or during a payment approval process. For example, the user may be logging into an online shopping account or preparing to purchase an item in an electronic shopping cart. In response to the user providing the physiological feature, the user can be authenticated using the registration information. In some implementations, the audio/video stream can be collected from a camera and a microphone received from a computer device used by the user, such as the user's mobile device or a laptop computer. From 808, method 800 proceeds to 810.

At 810, physiological recognition is performed on the audio/video stream to obtain a physiological feature of the target object. For example, the feature recognition module 64 can perform physiological recognition on the audio and video stream to obtain a physiological feature of the user.

In some implementations, method 800 can further include creating registration information identifying the user and including the physiological feature of the target object. The registration information can be stored in a database for subsequent use in authenticating the user. The registration process can follow the steps of the process described with reference to FIG. 1, for example. From 810, method 800 proceeds to 812.

At 812, the physiological feature of the target object is compared with the model physiological feature to obtain a comparison result. As an example, the authentication processing module 65 can compare the physiological feature of the target object with the model physiological feature (previously stored for the user) to obtain a comparison result.

In some implementations, the physiological feature can include a voiceprint feature and a facial feature, and the model physiological feature can include a model facial feature and a model voiceprint feature. Performing physiological recognition on the audio/video stream to obtain the physiological feature of the target object can include voiceprint and facial recognition. For example, voiceprint recognition can be performed on the audio/video stream to obtain a voiceprint feature of the target object. Voiceprint eigenvectors can be used, for example. Facial recognition can be performed on the audio/video stream to obtain a facial feature of the target object. The physiological feature of the target object can be compared with the model physiological feature to obtain a comparison result. If the comparison result satisfies an authentication condition, the voiceprint feature can be compared with the model voiceprint feature to obtain a voiceprint comparison score; and the facial feature can be compared with the model facial feature to obtain a facial comparison score. When the voiceprint comparison score and the facial comparison score satisfy the authentication condition (for example, exceeding a threshold score), the target object can be determined to been authenticated.

In some implementations, determining that the target object has been authenticated can include meeting at least one condition. A first condition, for example, can be determining that the voiceprint comparison score is greater than a voiceprint score threshold. A second condition, for example, can be determining that the facial comparison score is greater than a facial score threshold. A third condition, for example, can be determining that a product of the voiceprint comparison score and the facial comparison score is greater than a product threshold score. In some implementations, a weighted sum of the voiceprint comparison score and the facial comparison score can be determined, and authentication can occur if the weighted sum is greater than a weighted threshold score. From 812, method 800 proceeds to 814.

At 814, in response to the comparison result satisfying an authentication condition, a determination is made that the target object has been authenticated. The authentication processing module 65, for example, can determine that the user is authenticated if the comparison result satisfies an authentication condition. After 814, method 800 stops.

Techniques described in the present disclosure can be used to perform an identity authentication of a user. The authentication can use physiological recognition techniques on an audio/video stream of the user provided during user authentication, such as to enable the user to do online shopping using the user's account. Matching the audio to the video can assure a consistency, for example, between a voice recording and a lip reading that are provided together during user authentication. The matching can help to assure that a target object (assumed to be a user) is a living human being (such as a real human being in a video recording) instead of a simulated human being or some other invalid login attempt. The user authentication further contains a comparison between a physiological feature of the target object (previously stored for the user) and a physiological feature of the audio. This type of user authentication process can simplify the user's operation, improve user authentication efficiency, maintain a one-to-one user authentication model, and assure user recognition accuracy.

In some implementations, the user authentication can occur after a registration procedure has been completed for the user. As a result of the registration procedure, registration information of the user is stored in a database. The registration information can include an object identifier (identifying the user) and a corresponding model physiological feature. The model physiological feature can include a model voiceprint feature and a model facial feature of the user.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
    obtaining an audio/video stream of a user that is to be authenticated;
    determining that the user's voice in the audio/video stream matches the user's lips in the audio/video stream;
    in response to determining that the user's voice in the audio/video stream matches the user's lips in the audio/video stream, determining, based on performing automated speech recognition on the audio/video stream, a user identifier for the user;
    determining, based on performing automated physiological feature extraction on the audio/video stream, a physiological feature of the user;
    obtaining, from stored, object registration information, a stored, model physiological feature corresponding to the determined, user identifier;
    generating a comparison result based on comparing the physiological feature of the target object that was determined based on performing automated physiological feature extraction on the audio/video stream with the stored, model physiological feature; and
    in response to determining that the comparison result satisfies an authentication condition, determining that the user has been authenticated.

2. The method of claim 1, wherein the physiological feature of the user comprises a facial feature of the user.

3. The method of claim 1, wherein the comparison result comprises a similarity score.

4. The method of claim 1, wherein determining that the comparison result satisfies an authentication condition comprises determining that a similarity score exceeds a threshold score.

5. The method of claim 1, wherein determining that the user's voice in the audio/video stream matches the user's lips comprises:

determining a lip reading syllable in a video image of the audio/video stream at a particular point in time;

determining a voice syllable in audio of the audio/video stream at the particular point in time; and determining that the lip reading syllable and the voice syllable match.

6. The method of claim 1, comprising storing the model physiological feature in the object registration information.

7. The method of claim 1, comprising receiving a request from the user to authenticate, wherein the audio/video stream of the user is obtained in response to the request.

8. A non-transitory, computer-readable medium storing one or more instructions executable by a computer system to perform operations comprising:

obtaining an audio/video stream of a user that is to be authenticated;

determining that the user's voice in the audio/video stream matches the user's lips in the audio/video stream;

in response to determining that the user's voice in the audio/video stream matchesthe user's lips in the audio/video stream, determining, based on performing automated speech recognition on the audio/video stream, a user identifier for the user;

determining, based on performing automated physiological feature extraction on the audio/video stream, a physiological feature of the user;

obtaining, from stored, object registration information, a stored, model physiological feature corresponding to the determined, user identifier;

generating a comparison result based on comparing the physiological feature of the target object that was determined based on performing automated physiological feature extraction on the audio/video stream with the stored, model physiological feature; and in response to determining that the comparison result satisfies an authentication condition, determining that the user has been authenticated.

9. The medium of claim 8, wherein the physiological feature of the user comprises a facial feature of the user.

10. The medium of claim 8, wherein the comparison result comprises a similarity score.

11. The medium of claim 8, wherein determining that the comparison result satisfies an authentication condition comprises determining that a similarity score exceeds a threshold score.

12. The medium of claim 8, wherein determining that the user's voice in the audio/video stream matches the user's lips comprises:

determining a lip reading syllable in a video image of the audio/video stream at a particular point in time;

determining a voice syllable in audio of the audio/video stream at the particular point in time; and determining that the lip reading syllable and the voice syllable match.

13. The medium of claim 8, wherein the operations comprise storing the model physiological feature in the object registration information.

14. The medium of claim 8, wherein the operations comprise receiving a request from the user to authenticate, wherein the audio/video stream of the user is obtained in response to the request.

15. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

obtaining an audio/video stream of a user that is to be authenticated;

determining that the user's voice in the audio/video stream matches the user's lips in the audio/video stream;

in response to determining that the user's voice in the audio/video stream matches the user's lips in the audio/video stream, determining, based on performing automated speech recognition on the audio/video stream, a user identifier for the user;

determining, based on performing automated physiological feature extraction on the audio/video stream, a physiological feature of the user;

obtaining, from stored, object registration information, a stored, model physiological feature corresponding to the determined, user identifier;

generating a comparison result based on comparing the physiological feature of the target object that was determined based on performing automated physiological feature extraction on the audio/video stream with the stored, model physiological feature; and in response to determining that the comparison result satisfies an authentication condition, determining that the user has been authenticated.

16. The system of claim 15, wherein the physiological feature of the user comprises a facial feature of the user.

17. The system of claim 15, wherein the comparison result comprises a similarity score.

18. The system of claim 15, wherein determining that the comparison result satisfies an authentication condition comprises determining that a similarity score exceeds a threshold score.

19. The system of claim 15, wherein determining that the user's voice in the audio/video stream matches the user's lips comprises:

determining a lip reading syllable in a video image of the audio/video stream at a particular point in time;

determining a voice syllable in audio of the audio/video stream at the particular point in time; and determining that the lip reading syllable and the voice syllable match.

20. The system of claim 15, wherein the operations comprise storing the model physiological feature in the object registration information.

* * * * *

UNITED STATES PATENT AND TRADEMARK OFFICE
CERTIFICATE OF CORRECTION

PATENT NO. : 10,789,343 B2
APPLICATION NO. : 16/192401
DATED : September 29, 2020
INVENTOR(S) : Peng Li et al.

It is certified that error appears in the above-identified patent and that said Letters Patent is hereby corrected as shown below:

In the Claims

In Claim 8, Column 17, Line 21, delete "matchesthe" and insert -- matches the --, therefor.

Signed and Sealed this
Twenty-seventh Day of July, 2021

Drew Hirshfeld
*Performing the Functions and Duties of the*
*Under Secretary of Commerce for Intellectual Property and*
*Director of the United States Patent and Trademark Office*